C. S. SKINNER.
DISK SUPPORT.
APPLICATION FILED JULY 6, 1909.
975,298.
Patented Nov. 8, 1910.
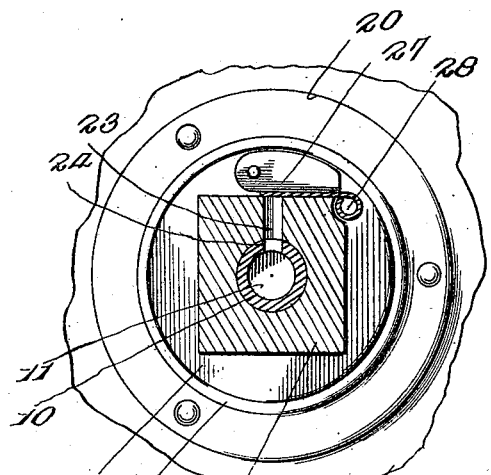
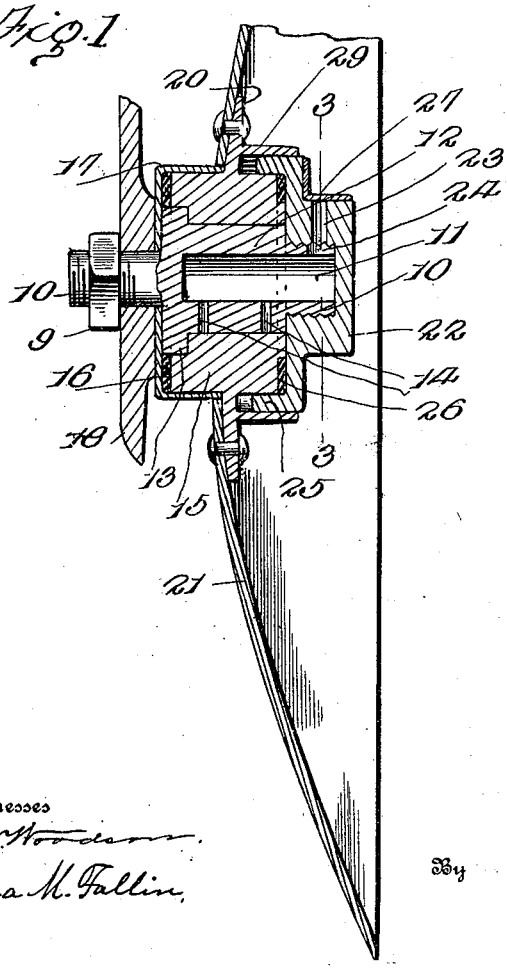
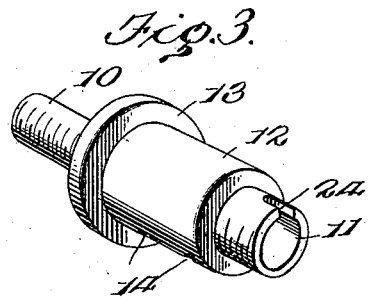
Inventor
Clarence S. Skinner
Witnesses
By
Attorneys

UNITED STATES PATENT OFFICE.

CLARENCE S. SKINNER, OF PAYNE, OHIO.

DISK-SUPPORT.

975,298.

Specification of Letters Patent.   Patented Nov. 8, 1910.

Application filed July 6, 1909.   Serial No. 506,165.

*To all whom it may concern:*

Be it known that I, CLARENCE S. SKINNER, citizen of the United States, residing at Payne, in the county of Paulding and State of Ohio, have invented certain new and useful Improvements in Disk-Supports, of which the following is a specification.

This invention relates generally to agricultural implements and refers particularly to a novel means for supporting disks on drills, seeders and the like.

An object of this invention is to construct a spindle of novel formation for the support of disks which will prevent access of sand, gravel or the like to the bearing parts, thereby preventing injury to the same, and lengthening the usage of the implement.

The invention has for another object the provision of an improved spindle which is provided with oil channels for feeding a heavy oil to the bearing of the disks thereby insuring the proper lubrication during the actuation of the same.

The invention has for a still further object the provision of an improved spindle for supporting the disk which is of simple formation and which is of such construction as to permit of the easy removal of the disk and provides means for ready access to the lubricating channel for cleansing or supplying a lubricant thereto when it is desired.

For a full understanding of the invention reference is to be had to the following description and accompanying drawings, in which:—

Figure 1 is a vertical transverse section through the improved spindle. Fig. 2 is a section on the line 3—3 of Fig. 1, and Fig. 3 is a detail perspective view of the spindle detached.

Corresponding and like parts are referred to in the following description and indicated in all the views of the drawing by the same reference characters.

Referring to the drawing the numeral 10 designates a spindle which is threaded at its opposite extremities and which is provided at one end with a bore 11 which extends inwardly of the spindle 10 and terminates at a point adjacent the opposite end thereof. The spindle 10 is enlarged intermediately to form a bearing drum 12 which terminates at one end in a flange 13 and which is provided upon its under face with a pair of channels or passages 14 communicating with the bore 11 of the spindle 10. Mounted upon the drum 12 and adapted to rotate thereabout is a hub 15 which comprises a sleeve which is countersunk at one end to receive a portion of the flange 13 so as to cause the same to fit snugly with the end of the hub 15 and to admit of the positioning of a washer 16 thereagainst which is retained in such position by the employment of a cap 17. The disk or washer 16 is preferably formed of leather and is retained against the flange 13 and the end of the hub 15 by inserting the inner end of the shank 10 through a standard 18 or other suitable support and positioning the clamping nut 19 thereon to draw the spindle 10 inwardly and impinge the cap 17 against the washer 16.

The hub or sleeve 15 is provided with an annular flange 20 upon which is riveted a disk 21. The outer end of the drum 12 terminates in the plane of the outer end of the hub 15, while the hollow end of the spindle 10 projects beyond the same and supports in threaded relation a nut 22. The nut 22 is adapted to close the end of the bore 11, is positioned upon the spindle 10 adjacent the drum 12 and is provided with a channel 23 extended upwardly through the same to register with a cut-away portion 24 formed in the end on the upper face of the spindle 10 to communicate the channel 23 with the bore 11. The nut 22 is provided with a circular cap 25 which is integrally formed therewith and which engages over the end of the hub 15. The hub 15 is provided with an annular shoulder formed by the reduction of the end of the same upon which is disposed a washer 26 to form a tight joint between the cap 25 and the hub 15. The washer 26, like the washer 16, is preferably formed of leather to permit of the sealing of the passage between the moving parts. On the outer face of the cap 25 a leaf 27 is pivotally mounted which is provided upon its outer end with a turned over portion 28, the leaf 27 being formed of a portion of spring metal, which fits into a depression formed in the end of the nut 22 and resiliently retains the leaf 27 against the face of the nut 22 to close the channel 23. To further seal the joint between the cap 26 and the hub 15 the flange 20 is provided with a web 29 which extends outwardly and snugly engages over the cap 26 to deflect dirt dropped from the disk 21 upon the hub 15.

In this construction it will be observed that the spindle is supported rigidly upon the standard 18 through the medium of the clamping nut 19 so as to dispose the channels 14 downwardly and to normally hold the cut-away portion 24 in an upward position. The hub 15 is permitted a free rotation about the drum 12 and is lubricated by the passing of a lubricant through the bore 11 and channels 14 where it is fed to the contacting surfaces of the drum 12 and hub 15. The employment of the caps 17 and 25 and their positioning against the opposite ends of the hub 15 and drum 12 insures a tight joint at each end of the spindle, especially since a packing is provided beneath each of the caps and the web 29 is formed to deflect the dirt from the outer cap 25. The employment of the leaf 27 admits of the raising of the leaf and of the introduction of oil to the bore 11 without the necessity of disassembling the parts of the device.

Having thus described the invention what is claimed as new is:—

1. In combination with a rotating element, a hub carried by the rotating element and having an annular depression at one end thereof, a spindle engaged through said hub and having a drum formed centrally thereon for engagement against the inner face of said hub, said spindle also having a flange at one end thereof to engage in the depression in said hub and an opposite threaded extremity, and caps fitted upon the opposite ends of said spindle for engagement with the hub.

2. A device as specified including a spindle having a drum formed centrally thereon, and a flange formed at one end of the drum, a hub engaged upon the spindle over the drum and against the flange, said spindle having a bore formed in the outer end thereof and extending inwardly toward the opposite end of the same, said drum having channels extending downwardly therethrough and registering with the bore, caps disposed against the opposite ends of said hub and said drum, washers interposed between said caps and said hub and said drum, and an annular flange formed centrally on said hub to support an element.

3. A bearing including a spindle hollow at one end and having a drum with radial channels communicating with the hollow end of the spindle, caps engaging upon the opposite ends of said spindle against the drum, a hub rotatably disposed about the drum and engaged between said caps, washers arranged between said caps and said hub, and a cover hingedly disposed upon the outer face of the cap for engagement against the side of the nut to close the channel therein.

4. A bearing including a hollow spindle having a drum formed thereon, with channels therein communicating with the center of the spindle, a cap carried by the spindle and engaged against one end of the drum, said cap having a nut formed upon its outer face in threaded engagement with the spindle, said nut having a channel formed therein communicating with the interior of the spindle, a cover hingedly carried by said cap for engagement against the nut to close the channel, a hub mounted on the drum against said cap to support an element, a second cap engaged upon the opposite end of said spindle and against said hub, washers interposed between said caps and said hub, and means disposed upon the inner end of said spindle for supporting the same.

In testimony whereof I affix my signature in presence of two witnesses.

CLARENCE S. SKINNER. [L. S.]

Witnesses:
 JOHN W. LENTZ,
 W. S. KECKLEY.